US009114465B2

(12) United States Patent
Engen

(10) Patent No.: US 9,114,465 B2
(45) Date of Patent: Aug. 25, 2015

(54) ARTICLE AND CORRESPONDING KIT INCLUDING AN ARTICLE FOR RECEIVING AND SUPPORTING AN INSERTING PORTION OF A CIRCULAR SAW BLADE AND A ROUTER BIT IN IMMERSING FASHION WITHIN A VOLUME OF A CLEANING FLUID

(76) Inventor: Gerald D. Engen, Flint, MI (US)

( * ) Notice: Subject to any disclaimer, the term of this patent is extended or adjusted under 35 U.S.C. 154(b) by 906 days.

(21) Appl. No.: 13/342,254

(22) Filed: Jan. 3, 2012

(65) Prior Publication Data

US 2012/0096658 A1 Apr. 26, 2012

Related U.S. Application Data

(63) Continuation-in-part of application No. 12/250,907, filed on Oct. 14, 2008, now abandoned.

(60) Provisional application No. 60/980,089, filed on Oct. 15, 2007.

(51) Int. Cl.
*B23D 57/00* (2006.01)
*B23D 59/00* (2006.01)

(52) U.S. Cl.
CPC ..................................... *B23D 59/00* (2013.01)

(58) Field of Classification Search
CPC ...... G11B 3/58; G11B 3/5827; G11B 3/5809; G11B 3/589
USPC .................. 134/61, 84, 88, 92, 137, 157, 201
See application file for complete search history.

(56) References Cited

U.S. PATENT DOCUMENTS

| 1,420,004 | A | * | 6/1922 | Weide | 206/309 |
| 2,426,800 | A | | 9/1947 | Triplett | |
| 2,938,732 | A | * | 5/1960 | Mantell, Jr. | 134/149 |
| 3,401,708 | A | | 9/1968 | Henes | |
| 3,460,418 | A | | 8/1969 | Mathe et al. | |
| 3,808,922 | A | | 5/1974 | Ohlhoff et al. | |
| 4,162,552 | A | | 7/1979 | Winter | |
| 6,675,481 | B2 | | 1/2004 | Wu et al. | |

FOREIGN PATENT DOCUMENTS

| CN | 101108382 A | 1/2008 |
| PL | 0141853 B1 | 8/1987 |

* cited by examiner

*Primary Examiner* — David Cormier
(74) *Attorney, Agent, or Firm* — Gifford, Krass, Sprinkle, Anderson & Citkowski, P.C.; Douglas J. McEvoy

(57) ABSTRACT

A three dimensional article and corresponding kit containing such an article exhibiting an upper accessible slot communicating with a three dimensional interior recess for receiving a likewise configured arcuate inserting portion of a circular saw blade. A volume of a cleaning solution is deposited upon interior surfaces of the article exposed to the interior recess and, upon insertion of the blade, the cleaning solution acts to remove sap and other build up contaminants typically associated with certain varieties of natural wood. The lengthwise extending surface configuration of the recess is further such that it exerts an inwardly opposing/biasing force to the inserted circular blade, this serving to retain the blade in place and further as it is slowly rotated throughout a 360° cycle to evenly clean all the perimeter extending teeth. Cleaning brushes and brush keys are also provided in the kit for assisting in cleaning the individual teeth.

20 Claims, 5 Drawing Sheets

ARTICLE AND CORRESPONDING KIT INCLUDING AN ARTICLE FOR RECEIVING AND SUPPORTING AN INSERTING PORTION OF A CIRCULAR SAW BLADE AND A ROUTER BIT IN IMMERSING FASHION WITHIN A VOLUME OF A CLEANING FLUID

CROSS-REFERENCE TO RELATED APPLICATIONS

This Application is a continuation-in-part of U.S. application Ser. No. 12/250,907, filed Oct. 14, 2008, which in turn claims the benefit of U.S. Provisional Application 60/980,089 filed on Oct. 15, 2007.

FIELD OF THE INVENTION

The present invention relates generally to an article, both individually and as part of a kit, for assisting in the safe handling, cleaning and reconditioning of perimeter extending teeth associated with a circular saw blade. More specifically, the invention discloses the article as exhibiting an upper accessible slot in communication with a three dimensional extending interior for receiving an arcuate (e.g. pseudo crescent shape) inserting portion of the circular saw blade. A volume of a cleaning solution can be deposited within the slot (such as through the application of an eyedropper) and/or may be sprayed onto the exterior of the blades (such as along the outermost perimeter extending sides and typically following initial insertion and upstanding support of the circular blade relative to the article prior to controlled and resistive rotation to thereby assist in cleaning the outer blade perimeter in relatively safe fashion.

The volume of a cleaning solution is deposited upon interior surfaces of the article exposed to the interior recess and, upon insertion of the blade, the cleaning solution acts to remove such as sap or other contaminants typically associated with certain varieties of natural wood. The lengthwise extending surface configuration of the recess is further such that it exerts an inwardly opposing/biasing force to the inserted circular blade, this serving to retain the blade in place and further as it is slowly rotated throughout a 360° cycle to evenly clean all the perimeter extending teeth.

Additional to the cleaning/reconditioning of perimeter extending teeth of the circular saw blade, the article can also accommodate cleaning of a drill bit holding stem portion of a drill router bit. Additional features include a collection of steel brush and specifically configured linear brush keys for assisting in cleaning individual teeth profiles proximate the perimeter extending outer sides and edges of the rotary saw blade.

BACKGROUND OF THE INVENTION

Circular or rotary saws are well known in the art. A problem associated with such saws is the inevitable buildup of saps and other contaminants and which are often contained in significant amounts within certain types of natural woods.

Cleaning solutions for removing such saps are also known, however the process of applying such solutions to the sharpened and circumferentially extending blades usually requires that the circular blade be first dismounted from the rotary saw. The danger of handling of such blades is compounded by the slipperiness of the cleaning fluid applied and can accidentally result in injury to a user.

Unrelated cleaning and maintenance promoting disclosures are known in the prior art, among these the garden shears structure of U.S. Pat. No. 6,675,481, issued to Wu, and which exhibits a handgrip having a circular recess seated by a rotary plug. The plug exhibits a knob at the top which facilitates minimal force rotation during extrication from the hand grip. A spring is situated inside the circular recess, this in order to assist in smooth removal of the rotary plug. A pliant body permeated with oil is inserted into a hollow sleeve at the bottom of the rotary plug such that it is partially exposed. Following a cutting (e.g. flower or branch) operation, a physically worn or hand carried cloth serves as a means for simple cleaning and wiping away of sap, leaf fragments, soil and other grimy matter on the two blades of the truncating section. The oil permeating the pliant body is applied to shield them from air exposure, to prevent corrosion and provide lubrication.

U.S. Pat. No. 3,460,418, to Mathe, teaches a cleaner device for cleaning residue from a cutting edge of a rotary disc type cutter. A pair of cleaner blades are carried on a mounting block supported adjacent the cutting edge of the disc cutter. The cleaner blades are carried in a blade holder which is rotatably mounted in the mounting block with the cleaner blades extending alongside opposite faces of the disc cutter. Each of the cleaner blades has a dressing edge thereon with these edges normally being held out of contact with corresponding faces of the disc cutter. When the blade holder is rotated in either of two opposite directions, the dressing edges of the cleaner blades are moved into contact with the corresponding faces of the disc cutter along the surfaces thereof adjacent the cutting edge and remove any buildup of residue adhering thereto, and consequent to the cutting operation. A biasing member normally maintains the dressing edges out of contact with the disc cutter faces and which functions to return the same to a non-cleaning position after release of the rotative force applied to the blade holder for effecting cleaning.

Ohloff, U.S. Pat. No. 3,808,922 teaches a circular saw machine, such as for cutting soft metals at high speeds, and which includes a circular saw blade projecting through a slot in a work piece carrying table. A lower carriage is movable below the table and is adapted to feed the circular saw blade towards a work piece in the cutting direction. An upper carriage is arranged above the work table and is adapted to be moved along synchronously with the lower carriage. A nozzle is carried by the upper carriage and feeds a jet of cooling or lubricating medium substantially radially into the saw teeth immediately before entering the work piece.

Other references are known in the prior art, such as the vinyl LP cleaning devices of Henes U.S. Pat. No. 3,401,708 and of Winter, U.S. Pat. No. 4,162,552. In each instance, the cross sectional structure of the LP cleaning device utilizes an arcuate bath supporting reservoir within which the an edge portion of the vinyl LP record is immersed. In the further instance of Winter, abrading brushes are mounted along the inner immersing sides of the recess defining reservoir.

SUMMARY OF THE INVENTION

As previously described, the present invention relates generally to an article, both individually and as part of a kit, for assisting in the safe handling, cleaning and reconditioning of perimeter extending teeth associated with a circular saw blade. More specifically, the invention discloses the article as exhibiting an upper accessible slot in communication with a three dimensional extending interior for receiving an arcuate (e.g. pseudo crescent shape) inserting portion of the circular saw blade.

The three dimensional extending interior is defined by an interiorly communicable aperture for supporting, in immersing fashion within a cleaning solution, an inserting blade edge portion of a circular saw blade. The present invention is an improvement over the prior art technique of attempting hand-cleaning to a dismounted blade of sap buildup, in particular from the circumferential outer perimeter edges of the blade. A volume of a cleaning solution can be deposited within the slot (such as through the application of an eyedropper) and/or may be sprayed onto the exterior of the blades (such as along the outermost perimeter extending sides and typically following initial insertion and upstanding support of the circular blade relative to the article prior to controlled and resistive rotation to thereby assist in cleaning the outer blade perimeter in relatively safe fashion.

The support article exhibits an elongated (typically 3D rectangular) configuration and is constructed of a suitable material, such as an ultra high molecular weight polyurethane which, by construction, exhibits an inward bowing of the sides and associated arcuate recess formed into the top flat surface of the three dimensional article for supporting the inserted blade and to facilitate the pinching of the embedded teeth (such as which may further exhibit alternating side to side offset relative to a centerline of the saw blade). It is also envisioned that additional potential materials not limited to a heavy duty nylon or other rigid plasticized material can be employed.

The support article is further configured so that one or more blade accessible slots extend lengthwise along an upper surface of the article and communicates with a three dimensional arcuate interior recess for receiving a likewise configured inserting portion of a circular saw blade. A volume of a cleaning solution is deposited within interior surfaces of the article exposed to the interior recess and, upon insertion of the blade, the cleaning solution acts to remove such as sap or other contaminants typically associated with certain varieties of natural wood. The inward bowing of the lengthwise extending surface configuration of the recess is further such that it exerts an inwardly opposing/biasing force to the inserted perimeter edges of the blade supported in the selected arcuate recess, this serving to retain the blade in place and to facilitate cleaning of the sap buildup around its outer rotary disposed teeth and adjoining edges, as it is slowly rotated throughout a 360° cycle to evenly clean all the perimeter extending teeth.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
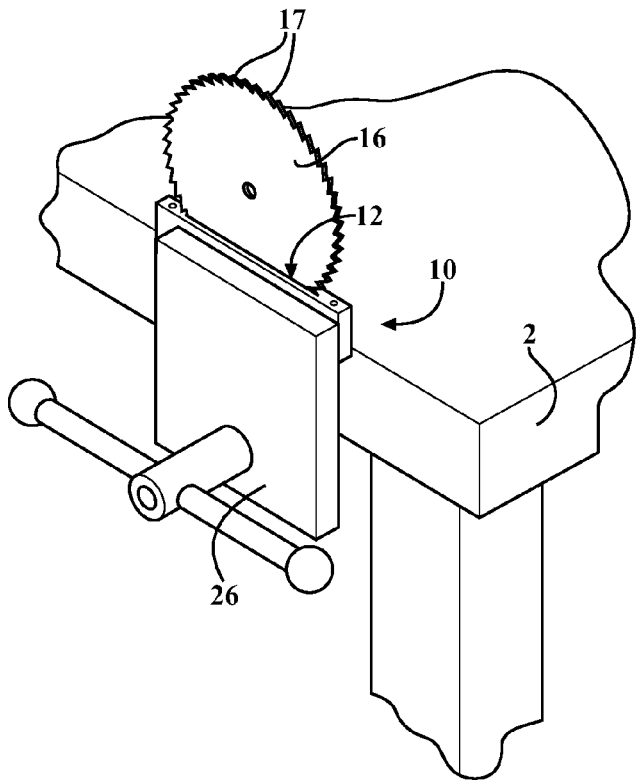
FIG. 1 is an environmental view in perspective of the article supporting and cleaning device according to one non-limited embodiment of the present inventions.

Referring now to FIG. 1, an environmental view is generally illustrated in perspective, at 10, of an article supporting and cleaning device according to one non-limited embodiment of the present inventions. As previously described, the present invention discloses a support article for cleaning the perimeter edges of the blade in a safe and immersive fashion, and which is an improvement over the prior art technique of attempting hand-cleaning to a dismounted blade of sap buildup, in particular from the circumferential outer perimeter edges of the blade.

The article of FIG. 1 is shown mounted to a table 2, such as through the provision of a vice assembly 26, this including a turning/clamp arm and associated pad supporting surface, these being constructed and configured so as to compress the article 10 against a side surface of the table 2. As will be disclosed in additional detail, and with reference to succeeding embodiments, the article can also be supported in a secure table top manner (such as shown in each of FIGS. 7 and 9), and in one non-limiting manner through the provision of a suitable cross brace (as will be further described in reference to the example of FIGS. 7 and 8).

As further shown in FIG. 1, the support article 10 exhibits an elongated (typically 3D rectangular) configuration and is constructed of a suitable material, such as an ultra high molecular weight polyurethane or any other suitable heavy duty nylon or other rigid plasticized material. It is further understood that other suitable materials can be employed in the construction of the elongated article 10, and without departing from the scope of the invention.

Figure 4:
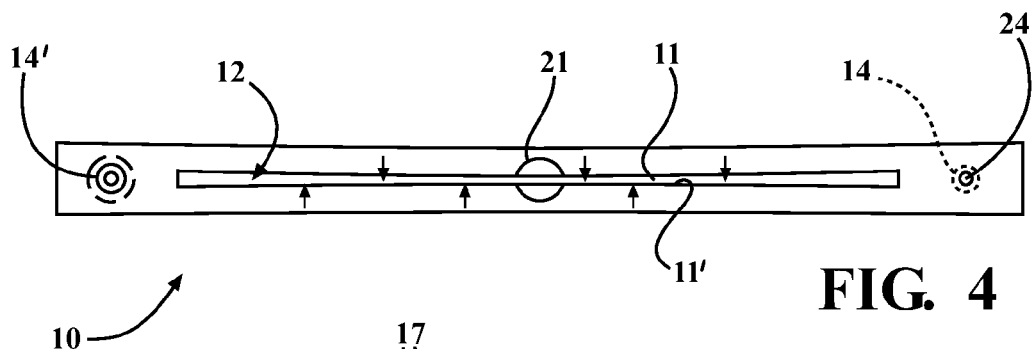
FIG. 4 is a top plan view of the article holding device of FIG. 1 and further showing such features as the centrally position/enlarged fluid applying aperture communicating with the lengthwise and arcuately recessed slot, as well as the router bit seating locations, and also illustrating the physical propensity of the opposing walls establishing the linear inserting recess to bow inwardly in a gripping and securing fashion about the side surfaces of the inserted rotary blade.
Figure 10:
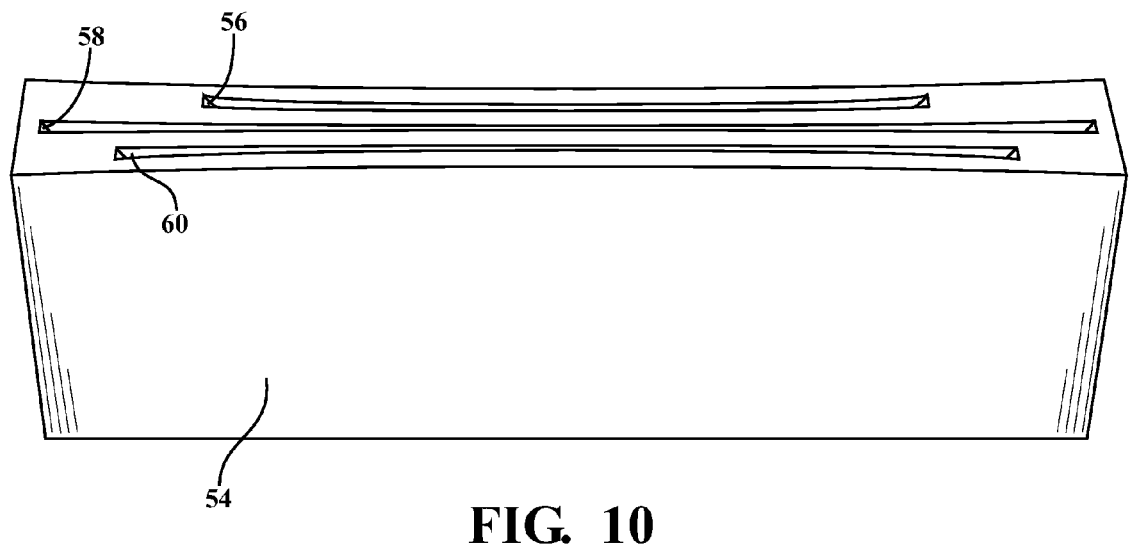
FIG. 10 is a perspective view of a main portion of an article supporting and cleaning device according to a further embodiment, again depicting an inwardly bowed profile and exhibiting multiple and individually configured arcuate slots for seating saw blades of differing diameter.

An advantage of using a material such as the high molecular weight polyurethane is such that, as shown in each of FIGS. 4 and 10, an inward bowing of the sides occurs following inward sawing of the upper surface defined and arcuate slot, and such that the associated arcuate recess slots are likewise inwardly pinched by virtue of the inward bowing of the sides. The blade accessible slots, as shown, extend lengthwise along an upper surface of the article and communicates with a three dimensional arcuate interior recess (designation 12 generally being shown throughout the figures and being understood to correspond to both the surface and width extending slot, as well as the three dimensional interior communicating space). This recessed configuration is established between opposing inner walls 11 and 11' (see also as best shown in the top plan view of FIG. 4)', and interconnected by an arcuate interior extending end surface 13, these collectively defining a three dimensional arcuate interior pocket defining the outline of the recess and for receiving a likewise configured inserting portion of a circular saw blade 16 with edge configured teeth.

Figure 3:
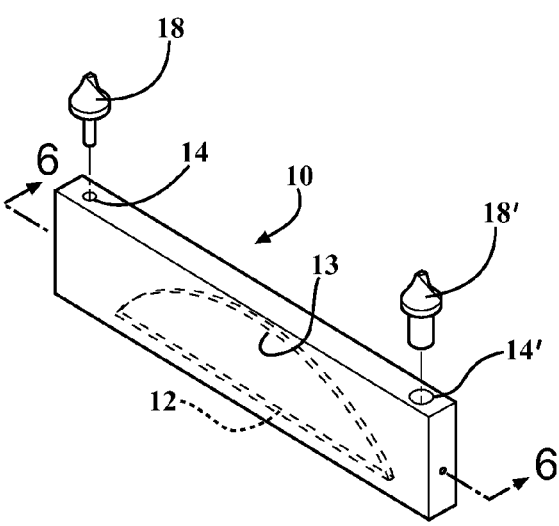
FIG. 3 is an inverted perspective of the article portion shown in FIG. 2 and further illustrating the provision of first and second alternately sized router drill bit receiving apertures for cleaning of the same.
Figure 5:
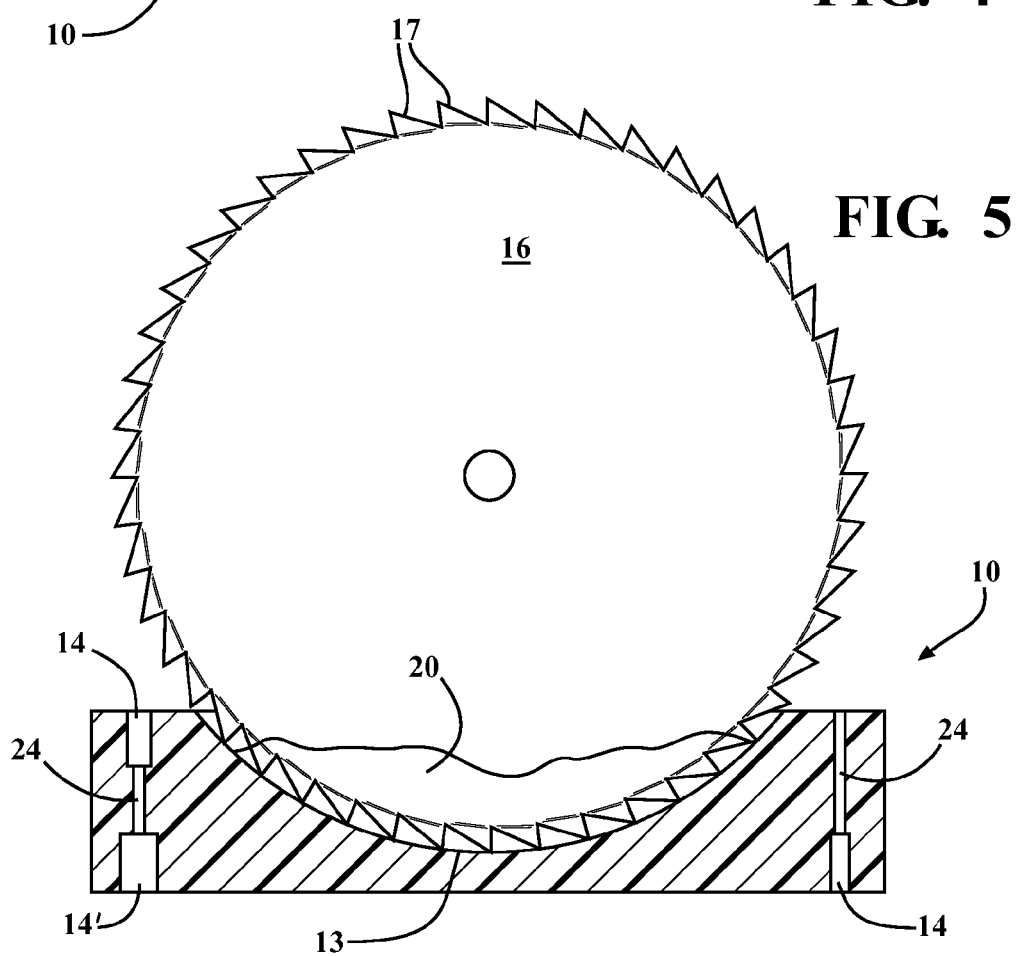
FIG. 5 is a cutaway view taken along line 5-5 of FIG. 2 and better illustrating the immersive aspect of the perimeter defined blade portion within the supporting article recess and applied cleaning fluid.
Figure 6:
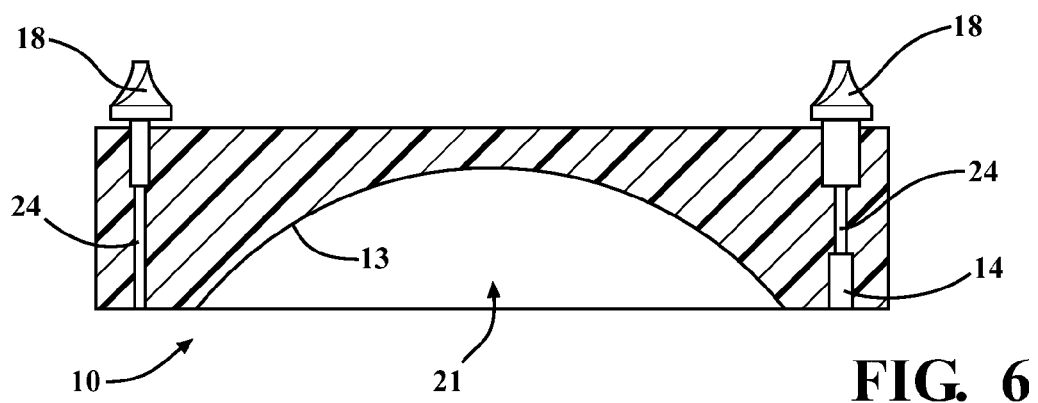
FIG. 6 is a cutaway view taken along line 6-6 of FIG. 3 and further showing the seating/cleaning support apertures associated with first and second differently sized and inserting router bits.

A pair of router shank holes, see at 14 and 14' (each of which further include communicating clearance holes 24 for ease of cleaning as well as a means for preventing the creation of undesirable vacuum forces and as best shown in the cutaway views of FIGS. 5 and 6), are arranged on opposite ends of the article 10. As further shown in the inverted illustration of FIG. 3, a pair of holes 14 (½" clearance) and 14' (¼" clearance) are provided on the underside surface of the article 10. As will be described, the holes are of a specified configuration suitable for receiving an inserting stem portion of a suitable router bit (see such at ¼" clearance router bit 18 as well as ½" clearance router bit 18' shown in FIG. 3).

A volume of a cleaning solution 20 (such as 3-5 ml in a typical application) is deposited within the interior defined surfaces of each the arcuate defined recess, as well as optionally within any of the router holes 14, 14', 24. The cleaning solution 20 is applied such as from a dropper 22 and is, by itself, known in the relevant art as being a solution suitable for removing saps and other impurities/buildup from around the exterior serrated edges of the rotary blade 16. A surface exposed enlargement aperture is shown at 21, this positioned in a generally centralized and communicating arrangement relative to the slot recess 12, and to provide a location for applying the desired volume of cleaning solution 20 in a non-spilling and evenly distributed fashion throughout the width extending interior of the arcuate recess.

Figure 11:
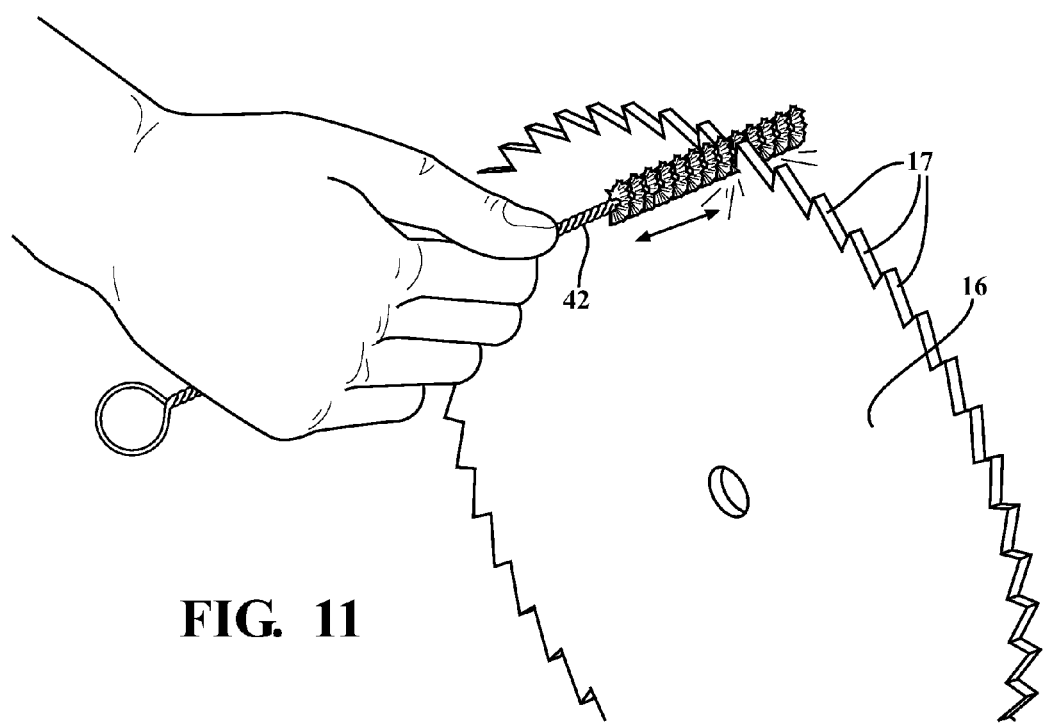
FIG. 11 is an operational view of a selected brush key employed with a teethed edge location of a saw blade, such as during a cleaning step which follows embedded and resistive rotation of the blade within the assist cleaning arcuate slots as previously described.

Upon insertion of the blade 16 as shown FIG. 5, an edge portion of the blade is seated within the arcuate interior profile (see again edge 13) the cleaning solution acts to assist in frictional removal of built up sap or the like typically associated with certain varieties of natural wood. In use, the saw blade 16 is placed into the defined slot and rotated for cleaning. As further best illustrated in the top plan view of FIG. 4, a physical propensity endemic with the use of certain types of nylon/plasticized material is the tendency of the opposing walls 11 and 11' (these again establishing the sides of the linear inserting recess 12) is to bow inwardly towards each other and in infringing fashion within the open space defining the interior arcuate recess, this facilitating the resistive cleaning of the outer faces of the perimeter extending blade during successive rotation of the saw blade through the arcuate slot and fluid filled reservoir, and such as which can be accomplished in combination with further cleaning steps as will be further described with reference to succeeding FIGS. 9-11.

In this fashion, the side walls 11 and 11' establish a degree of restraining contact, in a gripping and securing fashion, about the side surfaces of the inserted rotary blade 16. This biasing contact also serves to physically restrain the blade 16 as it is (slowly) rotated throughout a 360° cycle to assist in breaking down and at least partially removing sap build up along the perimeter extending teeth 17 (such as which can further exhibit alternating side to side extending profile which enhances the inwardly bowing gripping effect exerted by the sides of the article body). In such use, and following the user letting the blade stand for short period of time (e.g. 5 minutes) following completion of the rotating cycle, the blade 16 is withdrawn from the article 10 is withdrawn from the article in either a partially or substantially cleaned fashion and prior to finishing cleaning steps such as associated with the kit variant of FIGS. 9-11.

Referring again to FIG. 2, and following a desired blade cleaning operation, a "popsicle" type cleaning stick 23 is utilized for removing residual contaminants (e.g. any remaining contaminated volume of cleaning fluid such as intermixed with sap). The dimensions of a flattened stick 23 or like configured implement are such that they are easily inserted within the confines of the arcuate extending recess 12 and are capable of easily and quickly removing the interior contaminants, such as prior to storage and/or reuse. It is also envisioned that the article 10 can be rinsed under running water and in order to clean any remaining impurities. A spray bottle 25 can also be provided with a volume of the cleaning solution and which can be applied to the perimeter extending boundary (such as along an outermost 1½" band) of the circular saw blade 16 following upstanding insertion within the crescent/arcuate slot 12 to assist in sap cleaning (this being provided such as additionally and/or alternatively to additional volumes of cleaning solution applied within the slot interior by the eyedropper 22.

Figure 2:
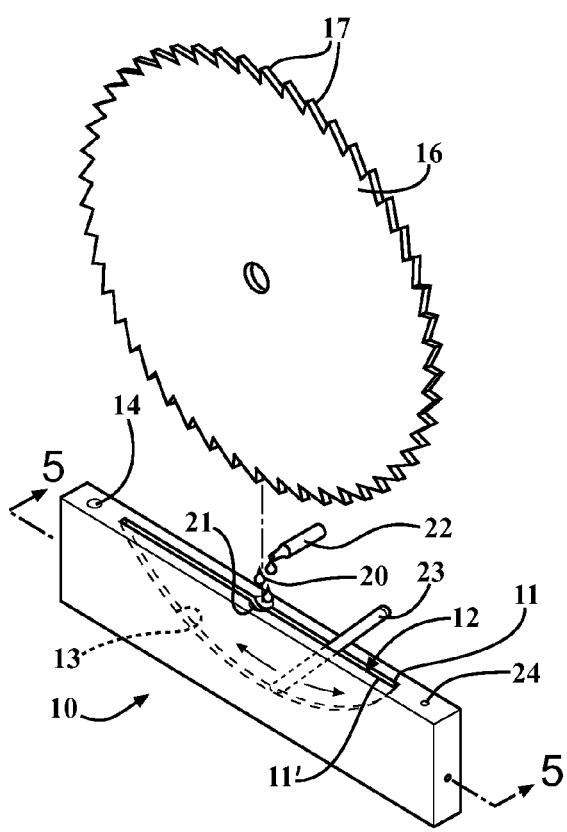
FIG. 2 is a partially exploded illustration similar to that shown in FIG. 1 and further showing the features of the arcuate shaped recess portion associated with the support article, as well as the manner of eye-dropper applying the cleaning solution, as well as the provision of a "popsicle" type cleaning stick for removing residual contaminants, such as following a cleaning operation.

Referring again to FIG. 3, the inverted perspective of the article portion shown in FIG. 2 further illustrates the ability of the user to engage a suitable sized router tool bit (again 18 and/or 18') within either of first or second sized (e.g. such as without limitation including ¼" or ½") holes 14 and 14', following pre-application of a desired volume of cleaning solution using the eyedropper 22, this in order to likewise suitably clean, in a likewise immersive fashion, additional sap buildups along contacting locations of a drill router also employed upon a sap entrained wood. Another option for the cleaning of router bits 18 contemplates them first being dipped into the cleaning fluid and then set into the suitable defined aperture for a desired period of time. The manner of sizing and inserting an associated router drill bit is further referenced in each of FIGS. 3 and 6, such that additional and clarifying explanation is not required.

Figure 7:
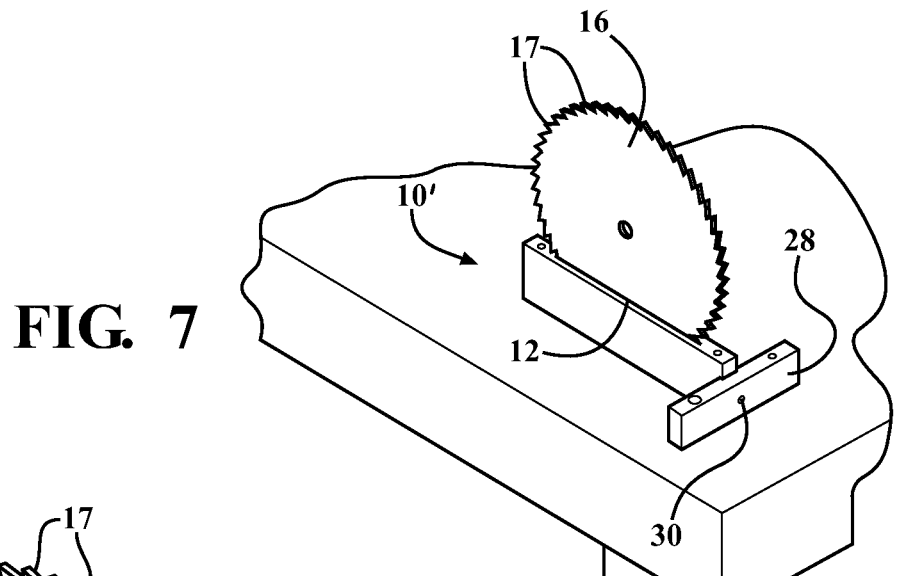
FIG. 7 is an environmental view in perspective of the article supporting and cleaning device according to a further non-limited embodiment of the present inventions.

Referring to FIG. 7, an environmental view is shown in perspective of the article supporting and cleaning device according to a further non-limited embodiment 10' of the present invention. As previously described, a stabilizer cross bar 28 can be applied to an end of the main blade supporting article and so that it can supported in a generally table top (non clamping) fashion.

Figure 8:
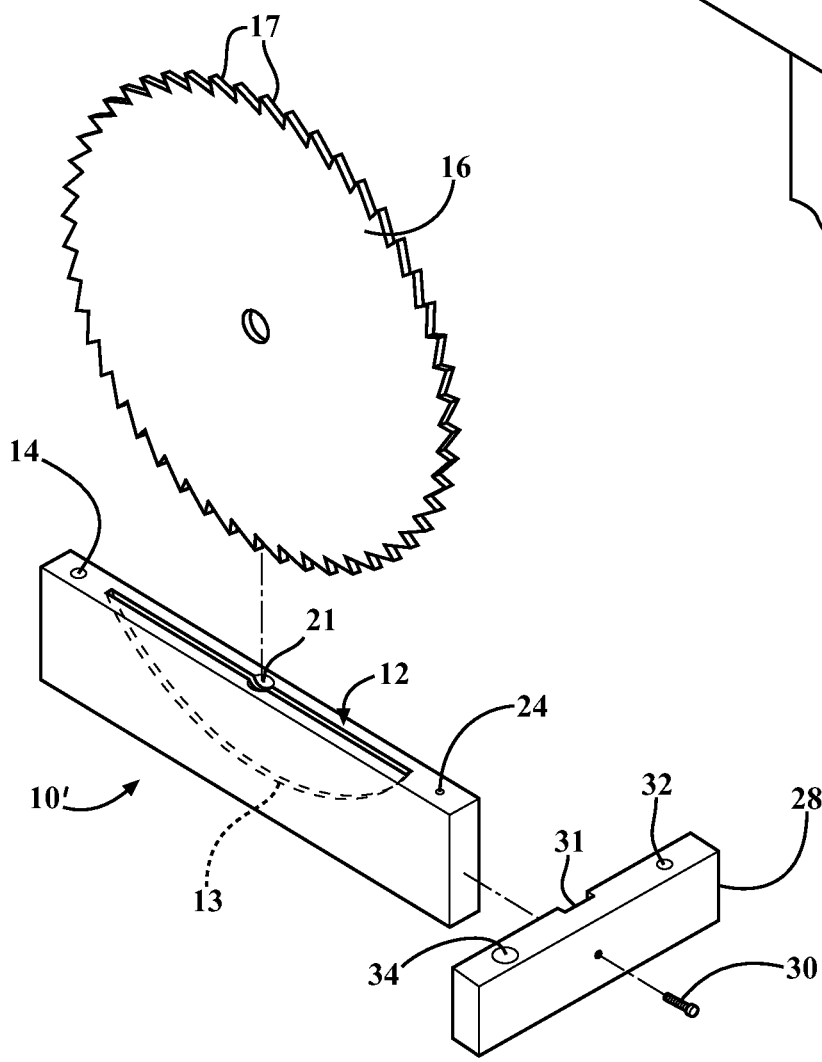
FIG. 8 is an exploded view of the article supporting device of FIG. 7 and again illustrating features such as the arcuate blade seating recess and which is accessed through the enlarged central communicating and fluid receiving aperture.

As further shown in the exploded view of FIG. 8, a mounting screw 30 is illustrated in one variant for securing the cross bar 28 (this also exhibiting an inner facing notched area 31) in a seating fashion to an end face location of the article, it being also understood that the article 10' can be constructed as one molded piece in which the cross bar 28 is integrally formed. Additional seating apertures 32 and 34 are illustrated defined in sideways extending locations of the cross bar 28 and within which can be secured drill router bits as previously illustrated.

As is further again shown in FIG. 8, the exploded view of the article supporting device again illustrates features such as the arcuate blade seating recess, and which is accessed through the enlarged central communicating and fluid receiving aperture.

Figure 9:
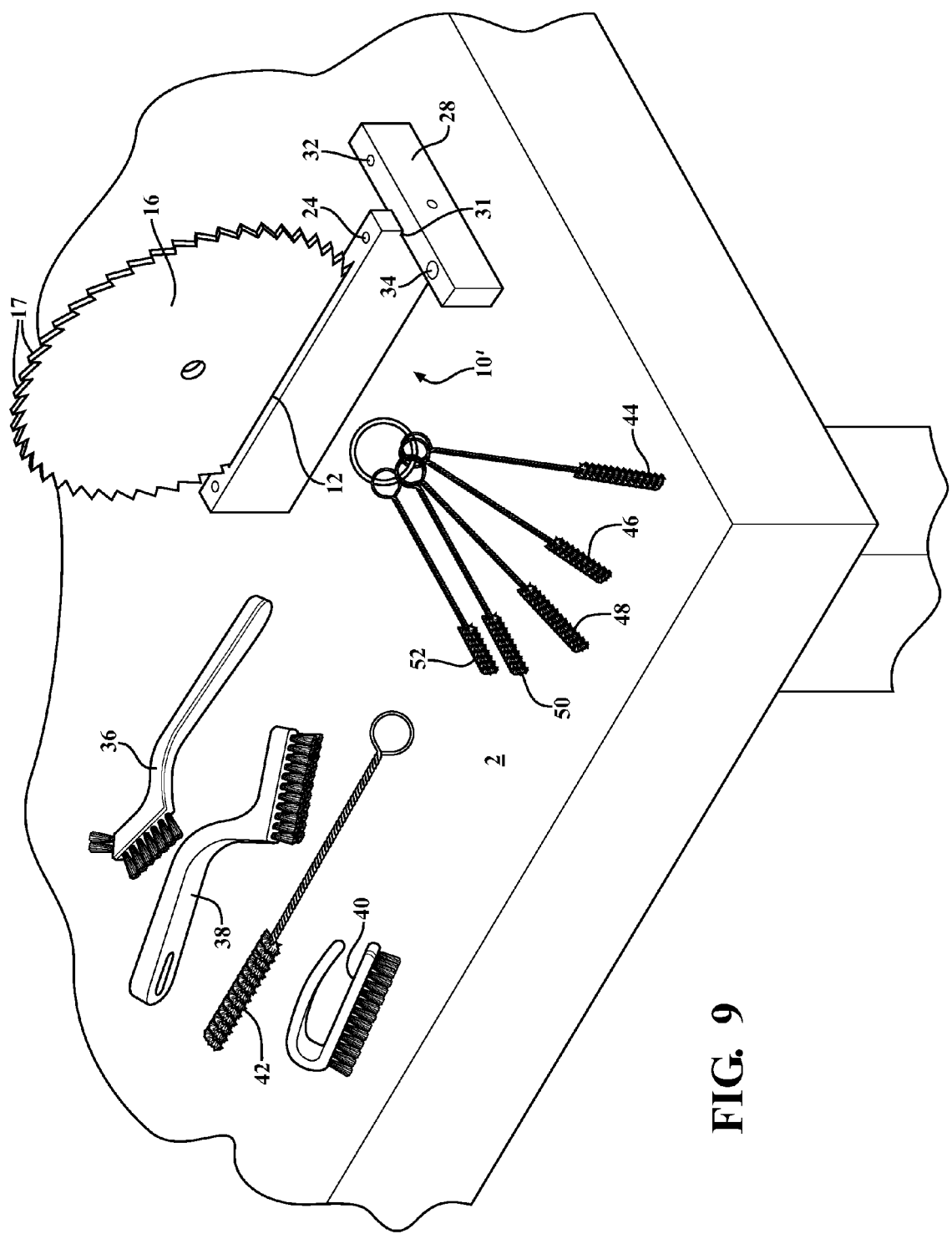
FIG. 9 is a perspective illustration of a further kit variation including an article supporting and cleaning device in combination with a plurality of rotary teeth cleaning brushes and associated brush keys.

Referring now to FIG. 9, a perspective illustration is shown of a further kit variation including an article supporting and cleaning device in combination with a plurality of rotary teeth cleaning brushes 36, 38 and 40 and associated brush keys 42, 44, 46, 48, 50 and 52. The brushes and brush keys are typically exhibit a hardened type of steel bristle, not limited to any one type of metallic composition, and which is manipulated in the manner shown in FIG. 11 such that a selected brush key 42 is employed in manipulating fashion by a user in order to successively abrade the serrated pattern associated with the teethed edge locations of the saw blade, such as during a cleaning step which follows embedded and resistive rotation of the blade within the assist cleaning arcuate slots as previously described. Any combination of brushes and/or brush keys can be manipulated in order to progressively clean, when necessary, remaining sap or other buildup associated with edge locations of the saw blade and which may have not been completed dissolved and/or abradingly removed by the physical rotation of the blade within the inwardly bowed and cleaning reservoir filled arcuate slots.

Finally, FIG. 10 is a perspective view of a main portion of an article supporting and cleaning device 54 according to a further embodiment, again depicting an inwardly bowed side profile and exhibiting multiple and individually configured arcuate slots (similar to that previously described and limited by reference to arcuate base surfaces 56, 58 and 60). The design of the three dimensional and typically rectangular article is further such that an of variously diameter sized rotary saw blades can be seated in the fashion previously described within a selected arcuate slot in order to facilitate abrading loosening and partial to substantial cleaning of sap from the outer blade perimeter sides and edges. Other final cleaning steps can include wiping the now cleaned rotary blade with a paper towel and, with reference to the sharpened tooth edges, use a small sticklike article such as a popsicle stick with a small paper or other fabric rag or strip.

Having described my invention, other and additional preferred embodiments will become apparent to those skilled in the art to which it pertains, and without deviating from the scope of the appended claims:

I claim:

1. A kit for assisting in cleaning an outer perimeter of a rotary saw blade, comprising:
    a body having a three dimensional shape and exhibiting an elongate and surface accessible slot communicating with a pair of spaced apart and interiorly bowed walls defined in said body, an arcuate interior extending and interconnecting end surface communicating with said interior walls to collectively define a recessed interior within said body matching that of an inserting portion of the rotary saw blade, and such that said walls exert a degree of controlled contact upon sides of the inserted rotary blade concurrent with the arcuate end surface contacting perimeter extending teeth of the rotary saw blade;
    an eyedropper for applying a volume of a cleaning solution within said recessed interior to immerse the inserting portion of the rotary blade and to facilitate cleaning the blade; and
    a flattened cleaning stick for cleaning a solution residue from within said recessed interior.

2. The kit as described in claim 1, further comprising a surface exposed enlargement aperture positioned in a generally centralized and communicating arrangement relative to said slot to provide a location for applying the desired volume of cleaning solution in a non-spilling and evenly distributed fashion throughout a width extending interior of the arcuate recess.

3. The kit as described in claim 1, further comprising a first and second router bit receiving holes defined at first and second locations of said body.

4. The kit as described in claim 3, further comprising clearance holes communicating with said router bit receiving holes for ease of cleaning as well as a means for preventing the creation of undesirable vacuum forces.

5. The kit as described in claim 4, further comprising a first ½" clearance hole and a second ¼" clearance hole.

6. The kit as described in claim 1, further comprising a crosswise extending support attached to an end surface of said body.

7. The kit as described in claim 1, said body further comprising an elongate rectangular shape.

8. The kit as described in claim 1, further comprising a plurality of arcuate extending slots arranged in spaced apart fashion within an upper surface of said body.

9. The kit as described in claim 1, further comprising at least one of a brush or a key brush for assisting in finish cleaning of the perimeter teeth.

10. An article for assisting in cleaning an outer perimeter of at least one of a rotary saw blade and a router drill bit, said article comprising:
    a body having a three dimensional shape and exhibiting an elongate and surface accessible slot communicating with a pair of spaced apart and interiorly bowed walls, an arcuate interior extending and interconnecting end surface communicating with said interior walls and collectively defining a recessed interior within said body matching that of an inserting portion of the rotary saw blade and such that said walls exert a degree of controlled and frictional contact upon sides of the rotary blade concurrent with the arcuate end surface contacting perimeter extending teeth of the rotary saw blade;
    first and second router bit receiving holes defined at further surface accessible locations of said body spaced from said recessed interior; and
    a cleaning solution applied to said arcuate recessed interior to immerse the inserting portion of the rotary blade and to facilitate abrading cleaning the blade.

11. The article as described in claim 10, further comprising a surface exposed enlargement aperture positioned in a generally centralized and communicating arrangement relative to said slot to provide a location for applying the desired volume of cleaning solution in a non-spilling and evenly distributed fashion throughout a width extending interior of the arcuate recess.

12. The article as described in claim 10, further comprising clearance holes communicating with said router bit receiving holes for ease of cleaning as well as a means for preventing the creation of undesirable vacuum forces.

13. The article as described in claim 12, further comprising a first ½" clearance hole and a second ¼" clearance hole.

14. The article as described in claim 10, further comprising a crosswise extending support attached to an end surface of said body.

15. The article as described in claim 10, said body further comprising an elongate rectangular shape.

16. The article as described in claim 10, further comprising a plurality of arcuate extending slots arranged in spaced apart fashion within an upper surface of said body.

17. The article as described in claim 10, further comprising at least one of a brush or a key brush for assisting in finish cleaning of the perimeter teeth.

18. A kit for assisting in cleaning an outer perimeter of a rotary saw blade, comprising:
- a rectangular shaped body exhibiting an elongate and surface accessible slot communicating with a pair of spaced apart and interiorly bowed walls defined in said body, an arcuate interior extending and interconnecting end surface communicating with said interior walls to collectively define a recessed interior within said body matching that of an inserting portion of the rotary saw blade and such that said walls exert a degree of controlled contact upon sides of the inserted rotary blade concurrent with the arcuate end surface contacting perimeter extending teeth of the rotary saw blade; and
- at least one of a brush or a key brush for assisting in finish cleaning of the perimeter teeth.

19. The kit as described in claim 18, further comprising an eyedropper for applying a volume of a cleaning solution within said recessed interior to immerse the inserting portion of the rotary blade and to facilitate cleaning the blade.

20. The kit as described in claim 18, further comprising a flattened cleaning stick for cleaning a solution residue from within said recessed interior.

\* \* \* \* \*